United States Patent [19]

Nagano

[11] Patent Number: 4,692,131
[45] Date of Patent: Sep. 8, 1987

[54] REAR DERAILLEUR FOR A BICYCLE
[75] Inventor: Masashi Nagano, Izumi, Japan
[73] Assignee: Shimano Industrial Company Limited, Osaka, Japan
[21] Appl. No.: 862,972
[22] Filed: May 14, 1986
[30] Foreign Application Priority Data May 20, 1985 [JP] Japan .............................. 60-108562
May 7, 1986 [JP] Japan .............................. 61-105711

[51] Int. Cl.[4] ............................................ F16H 11/00
[52] U.S. Cl. ........................................ 474/80; 474/82
[58] Field of Search ........................ 474/78, 79, 80, 82

[56] References Cited
U.S. PATENT DOCUMENTS

| 3,181,383 | 5/1965 | Juy | 474/82 |
| 4,406,643 | 9/1983 | Shimano | 474/82 |
| 4,443,208 | 4/1984 | Kozakae | 474/82 |
| 4,504,250 | 3/1985 | Juy | 474/80 |

Primary Examiner—Stephen J. Novosad
Assistant Examiner—Thomas J. Odar
Attorney, Agent, or Firm—Stevens, Davis, Miller & Mosher

[57] ABSTRACT

The derailleur is provided with a base member; a linkage mechanism including a support member, a pair of linkage members, and a movable member; and a chain guide having a guide sprocket and a tension sprocket. The support member is supported swingably relative to the base member through a first horizontal shaft, and the chain guide is supported swingably relative to the movable member through a second horizontal shaft. Also, first and second springs are provided between the base member and the linkage mechanism, and the movable member and the chain guide. The first and second springs balance with each other to set the position of the guide sprocket with respect to a selected particular rear chain gear. The spring force of at least one of the first and second springs is changed with respect to the other by the swinging motion of at least one of the linkage mechanism and the chain guide in excess of a predetermined angle, thereby yielding an optimum distance between the guide sprocket and the rear chain gear.

15 Claims, 12 Drawing Figures

REAR DERAILLEUR FOR A BICYCLE

FIELD OF THE INVENTION

The present invention relates to a rear derailleur for a bicycle, and more particularly, to a rear derailleur for a bicycle, which is provided with a base member; a linkage mechanism comprising a support member, a pair of linkage members, and a movable member; and a chain guide having a guide sprocket and a tension sprocket; the linkage mechanism is deformed by operating a control wire to move the chain guide in reciprocation, so that a driving chain guided by the chain guide is shifted to a desired particular rear chain gear of a multistage rear chain gear assembly, thereby changing the bicycle speed.

BACKGROUND OF THE INVENTION

This conventional type of rear derailleur, is described in Japanese Patent Laid-Open Gazette No. Sho 59-156,882. In this type of derailleur, the support member at the linkage mechanism is supported swingably to the base member through a first horizontal shaft, the chain guide is supported swingably to the movable member at the linkage mechanism through a second horizontal shaft. Also, there is provided between the base member and the linkage mechanism a first spring and between the movable member and the chain guide a second spring, so that the springs provide a predetermined tension to the driving chain and balance with each other to set the guide sprocket in a radial position of each rear chain gear at the multistage rear chain gear assembly. The first spring biases the linkage mechanism clockwise with respect to the base member when viewed from the front of the derailleur, in other words, in the direction of moving the guide sprocket radially outwardly of the rear chain gear and away from the axis thereof. The second spring biases the chain guide clockwise with respect to the linkage mechanism when viewed from the front of the derailleur, in other words, in the direction of moving the guide sprocket radially inwardly of the rear chain gear and toward the axis thereof.

The well-known type of chain guide provided at the rear derailleur come within two general types. Namely, one chain guide, as described in the aforesaid Japanese Patent Laid-Open Gazette, has a guide sprocket and a tension sprocket, which are disposed together with the second horizontal shaft in a triangle, thereby being called the triangular balance type or the balance type chain guide (to be hereinafter referred to generally as the triangular balance type). The other type of chain guide, as described in Japanese Patent Laid-Open Gazette No. Sho 58-149,882, has its guide sprocket supported on the second horizontal shaft and the tension sprocket shifted therefrom, thereby being called the pendulum type chain guide.

In the rear derailleur provided with the triangular balance type or the pendulum type chain guide, the spring forces of the first and second springs are set to obtain the optimum distance between the guide sprocket and the smallest diameter rear chain gear at the multistage rear chain gear assembly when the driving chain engages with the smallest diameter rear chain gear and the chain tension is reduced to a minimum, or between the guide sprocket and the largest diameter chain gear at the gear assembly when the chain engages with the largest diameter rear chain gear.

Where the rear derailleur sets the first and second springs to obtain the optimum distance between the guide sprocket and the smallest diameter rear chain gear, the chain, when shifted to the larger diameter rear chain gear, increases in tension, whereby the chain guide swings largely counterclockwise with respect to the linkage mechanism against the second spring and the linkage mechanism swings counterclockwise with respect to the base member against the first spring. In this case, the second spring deflects more than the first spring so that the first and second springs balance with each other at the position where the chain guide swings over a predetermined angle with respect to the linkage mechanism. Hence, the guide sprocket moves away from the larger diameter rear chain gear and the distance between the guide sprocket and the larger diameter rear chain gear becomes larger than the predetermined range, thereby creating a problem in that the speed change efficiency is decreased.

Also, there is a problem in that the guide sprocket, according to its position, may move excessively toward the larger diameter rear chain gear to cause interference therewith.

Where the spring forces of the first and second springs are set to obtain the optimum distance between the guide sprocket and the largest diameter rear chain gear, the chain tension decreases when the chain is shifted to the smaller diameter rear chain gear, and the chain guide swings clockwise by the second spring, so that the second spring has its spring force reduced relative to the first spring so as to balance the first and second springs with each other in the condition where the linkage mechanism swings clockwise by means of the first spring. As a result, the guide sprocket moves excessively toward the smaller diameter rear chain gear, thereby creating a problem in that the speed change efficiency is diminished and occasionally both the guide sprocket and the rear chain gear interfere with each other.

In addition, there is the problem that the guide sprocket, according to its position, may move away from the smaller diameter rear chain gear with the result that a distance therebetween increases to lower the speed change efficiency.

SUMMARY OF THE INVENTION

An object of the present invention is to provide a rear derailleur which eliminates the defect in the prior art in that the chain guide, when the chain is shifted from the smaller diameter rear chain gear to the larger diameter one, swings in excess of a predetermined angle due to an increase in chain tension, or the linkage mechanism, when the chain is shifted from the larger diameter rear chain gear to the smaller diameter one, swings in excess of a predetermined angle due to a decrease in the chain tension, so that a distance between the guide sprocket and the rear chain gear becomes larger than the predetermined range. The main point of the present invention is that, when at least one of the linkage mechanism and chain guide swings in excess of the predetermined angle, at least one of the first and second springs has its spring force changed with respect to the other to restrain the swinging motion of at least one of the linkage mechanism and the chain guide, thereby enabling the guide sprocket to be reduced in movement radially outward of the rear chain gear.

The present invention is characterized in that the rear derailleur for the bicycle, which shifts the driving chain to a desired one of the multistage rear chain gears, is provided with a base member; a linkage mechanism provided with a support member, a pair of linkage members, and a movable member; a first horizontal shaft through which the linkage mechanism is supported swingably to the base member; a chain guide provided with a guide sprocket and a tension sprocket; a second horizontal shaft through which the chain guide is supported swingably to the movable member at the linkage mechanism; a first spring interposed between the base member and the linkage mechanism to bias the linkage mechanism in the direction of moving the guide sprocket away from the rear chain gear and a second spring interposed between the movable member and the chain guide to bias the chain guide in the direction of applying tension to the chain, with the first and second springs being set to have the spring forces by which the guide sprocket and one rear chain gear are spaced from each other at an optimum distance when the chain engages with the smallest diameter chain gear or the largest diameter chain gear at the multistage chain gear assembly; and a spring force control means which changes the spring force of one of the first and second springs with respect to the other by the swinging motion of at least one of the linkage mechanism and chain guide in excess of a predetermined range.

The change of spring force of the first or the second spring by the spring force control means depends on the reference spring force of each spring and the type of the chain guide, for example, whether it is a triangular balance type or a pendulum type.

When the chain engages with the smallest rear chain gear, the spring forces of the first and second springs are set to obtain an optimum distance between the guide sprocket and the smallest diameter rear chain gear such that the spring force of the second spring is largely changed with respect to the first spring when the guide sprocket moves excessively away from a larger diameter rear chain gear for changing the bicycle speed thereto, and the spring force of the first spring is largely changed with respect to the second spring when the guide sprocket moves excessively toward the same.

Also, in order to set the spring forces of the first and second springs to have an optimum distance between the guide sprocket and the largest diameter rear chain gear when the chain engages therewith, the spring force of the first spring is largely changed with respect to the second spring when the guide sprocket moves excessively toward a smaller diameter rear chain gear for the speed change thereto, and that of the second spring is largely changed with respect to the first spring when the guide sprocket moves excessively away from the same.

The first and second springs operate relative to each other. Hence, in order to increase the spring force of the first spring, the first spring may have a larger spring force than the second spring, or the second spring may have a smaller spring force than the first spring. On the other hand, the second spring may have a larger spring force than the first spring, or the first spring may have a smaller spring force than the first spring, thereby increasing the spring force of the second spring with respect to the first spring.

In the aforesaid construction, at first, when the spring forces of the first and second springs are set to obtain the optimum distance between the guide sprocket and the smallest diameter rear chain gear, the chain, when shifted to the larger diameter rear chain gear, increases in tension, so that the chain guide swings counterclockwise against the second spring, and the linkage mechanism also swings counterclockwise against the first spring. When the guide sprocket is spaced excessively from the rear chain gear, the spring force control means increases the spring force of the second spring with respect to the first spring so as to restrict the swinging motion of the chain guide, and allows the linkage mechanism to forcibly swing further counterclockwise around the first horizontal shaft against the first spring, thereby moving the guide sprocket toward the rear chain gear the guide sprocket having moved away from the rear chain gear by swinging motion of the chain guide.

On the contrary, when the guide sprocket moves excessively toward the rear chain gear the spring force of the first spring increases with respect to the second spring so as to restrict the counterclockwise swinging motion of the linkage mechanism following the counterclockwise swinging motion of the chain guide, thereby preventing the guide sprocket from moving excessively close to the rear chain gear.

Next, where the spring forces of the first and second springs are set to obtain the optimum distance between the guide sprocket and the largest diameter rear chain gear, the chain, when shifted to the smaller diameter rear chain gear, is reduced in tension, so that the chain guide swings clockwise by the spring force of the second spring and the linkage mechanism swings clockwise by that of the first spring. When the guide sprocket moves excessively toward the rear chain gear, the spring force control means increases the spring force of the first spring with respect to the second one to restrict the clockwise swinging motion of the chain guide by the second spring, in other words, the first spring increases the clockwise swinging motion of the linkage mechanism, thereby preventing the guide sprocket from moving excessively toward the rear chain gear.

On the contrary, when the guide sprocket moves excessively away from the rear chain gear, the spring force of the second spring increases with respect to the first spring so as to restrict the clockwise swinging motion of the linkage mechanism by the first spring, thereby preventing the guide sprocket from moving away from the rear chain gear.

The above and further objects and novel features of the invention will be more fully apparent from the following detailed description when the same is read in connection with the accompanying drawings.

DETAILED DESCRIPTION OF THE INVENTION

Figure 3:
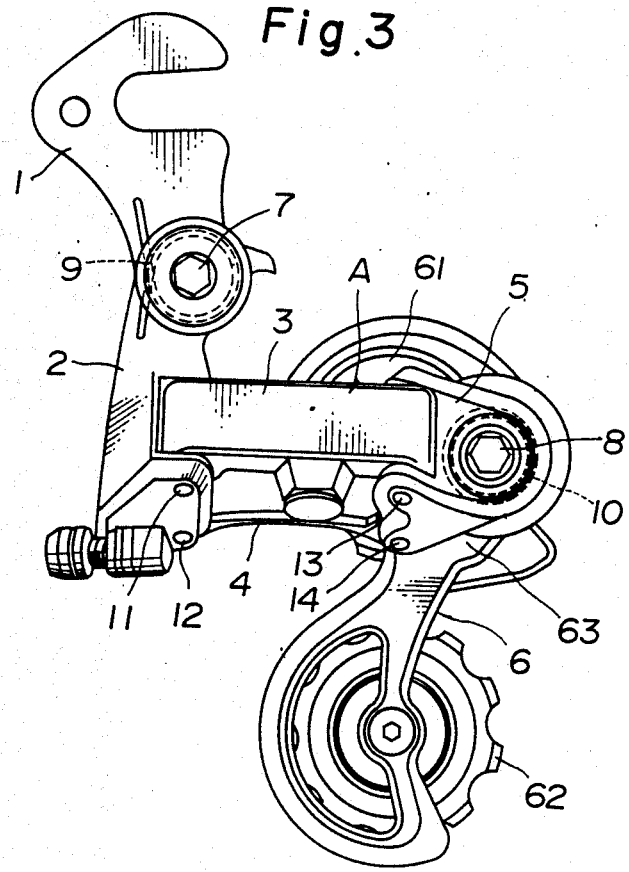
FIG. 3 is a general front view of the FIG. 1 embodiment of the derailleur of the invention.
Figure 4:
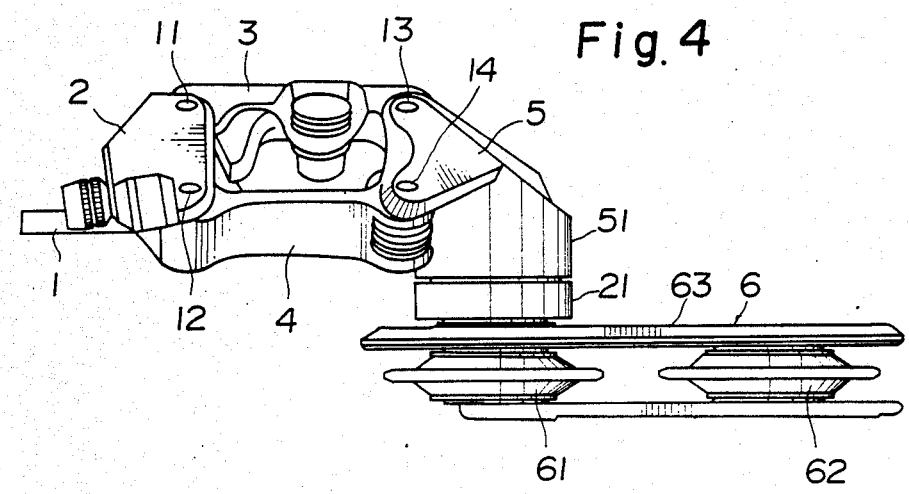
FIG. 4 is a bottom view of the FIG. 1 embodiment, in which a chain guide is swingable.

Referring to FIGS. 3 and 4, a derailleur provided with a chain guide of a triangular balance type is shown, the derailleur basically comprising a base member 1, a linkage mechanism A comprising a support member 2 and a pair of linkage members 3 and 4 and a movable member 5, and a chain guide 6 having a guide sprocket 61 and a tension sprocket 62. The support member 2 is supported swingably to the base member 1 through a first horizontal shaft 7, and chain guide 6 is supported swingably to the movable member 5 through a second horizontal shaft 8. A first spring 9 is interposed between the base member 1 and the support member 2 at the linkage mechanisn A, and a second spring 10 is interposed between the movable member 5 and the chain guide 6. First and second springs 9 and 10 balance with each other to set the guide sprocket 61 in the position radial of the rear chain gear, so that when the chain engages with the smallest diameter rear chain gear $G_1$, that is, when the chain tension is minimum, the spring forces of the first and second springs 9 and 10 are set to obtain an optimum distance between the guide sprocket 61 and the smallest diameter rear chain gear $G_1$.

Also, the base member 1 is fixed to a fork end (not shown) of the bicycle frame.

The support member 2 at the linkage mechanism A is provided at one side with a pair of mounting portions opposite to each other, the linkage members 3 and 4 being pivoted to the mounting portions through a pair of pins 11 and 12 and pivotally supporting at their free ends the movable member 5 through a pair of pins 13 and 14.

Figure 1:
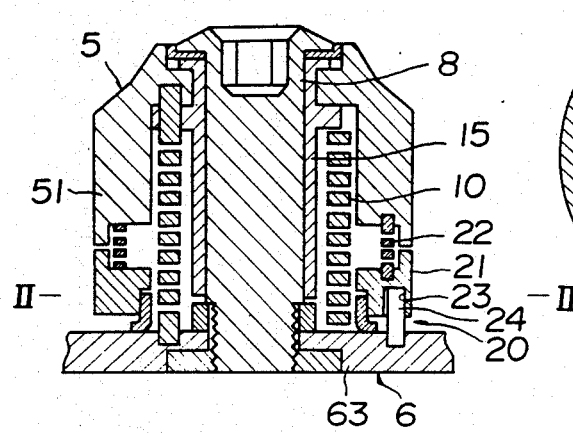
FIG. 1 is a sectional view of the principal portion of an embodiment of a rear derailleur of the invention.

The movable member 5 is formed like the support member 2 and is provided at one side with mounting portions opposite to each other, so that the linkage members 3 and 4 are pivoted to the mounting portions through the pins 13 and 14 such that the linkage members 3 and 4 and movable member 5 are swingable with each other. Movable member 5 is provided at its other side with a cylindrical portion 51 as shown in FIG. 1, which rotatably supports the second horizontal shaft 8 through a fixed tubular shaft 15.

The chain guide 6 comprises the guide sprocket 61, the tension sprocket 62 and a guide frame 63 supporting both the sprockets 61 and 62. Guide frame 63 is fixed at one end thereof to the axial end of the second horizontal shaft 8. The guide sprocket 61 and tension sprocket 62 are pivoted to the guide frame 63 so that the pivot points of these sprocket 61 and 62 and the fixed point of the guide frame 63 are disposed in a triangle. The chain C engages with these sprockets 61 and 62 in an inverted substantially S-shape and is adapted to be guided through the chain guide 6 to a desired particular rear chain gear of a multistage rear chain gear assembly provided with a plurality of chain gears having different numbers of teeth.

The first and second springs 9,10 comprise coiled springs and are fitted at their middle coiled portions onto the first and second horizontal shafts 7 and 8 respectively, the first spring 9 being retained at one end thereof to the base member 1 and at the other end to the support member 2, and the second spring 10 being retained at one end thereof to the movable member 5 and at the other end to the guide frame 63. Also, the first spring 9 biases the linkage mechanism A clockwise in FIG. 5 with respect to the base member 1, in other words, in the direction of moving the guide sprocket 61 radially outwardly of the rear chain gear and away from the axis thereof. Second spring 10 biases chain guide 6 clockwise in FIG. 5 with respect to the linkage mechanism A, in other words, in the direction of moving the guide sprocket 61 radially inwardly of the rear chain gear and toward the axis thereof.

Figure 5:
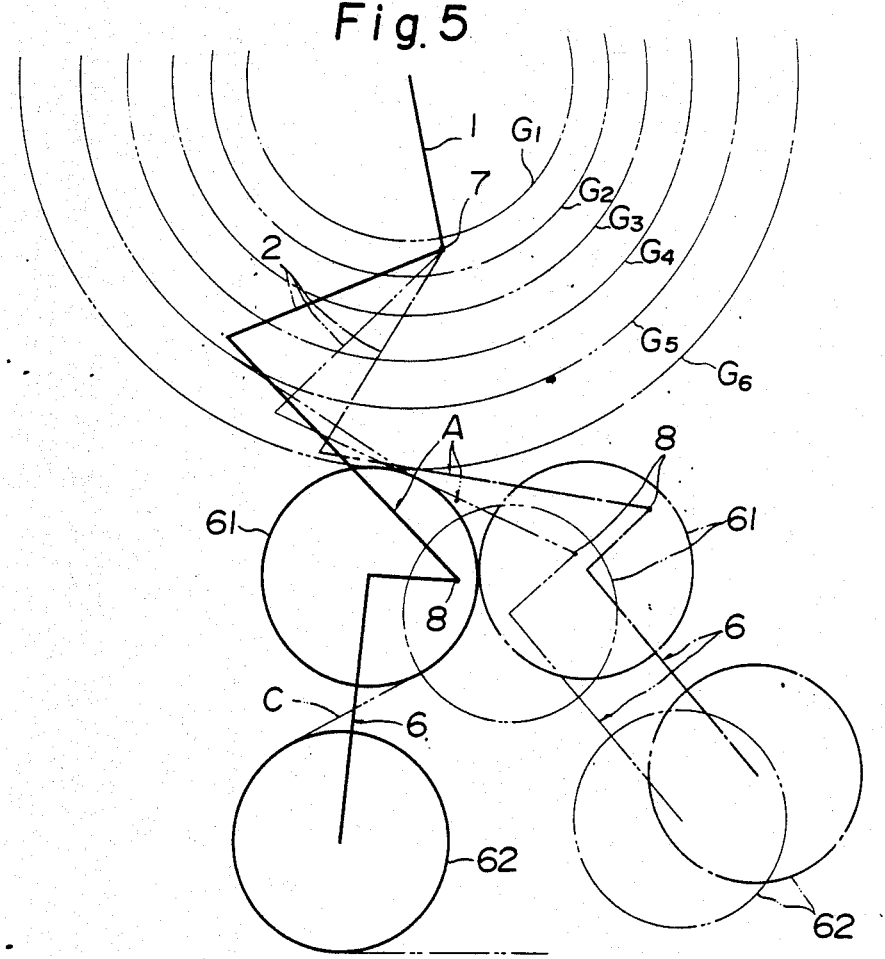
FIG. 5 illustrates the operation of the chain guide when a driving chain is shifted.

In the embodiment shown in FIGS. 1 through 4, between the movable member 5 and the chain guide 6 is provided a spring force control means 20 provided with a magnifying means which strengthens or increases the spring force of the second spring 10 with respect to the first spring 9 by swinging the chain guide 6 counterclockwise in FIG. 5 in excess of a predetermined angle of swing.

In further detail, a cylindrical relay member 21 is rotatably interposed between the end face of the cylindrical portion 51 at the movable member 5 and the guide frame 63, and a control spring 22 actuated by the swinging motion of the chain guide 6 in excess of the predetermined angle of swing is interposed between the relay member 21 and the cylindrical portion 51. A control groove 23 formed in a circular arc around the axis of rotation of guide frame 63 is provided at one of the relay member 21 and a guide frame 63, and an engaging member 24 engageable with the control groove 23 is provided at the other, so that when the chain guide 6 swings over the predetermined angle, the control spring 22 is deflected to substantially increase the spring force of the second spring 10 with respect to the first spring 9, thereby restricting the swinging motion of the chain guide 6 and forcibly swinging the linkage mechanism A counterclockwise in FIG. 5. In the above construction, the control spring 22 constitutes the magnifying means for magnifying the spring force of the second spring 10.

The predetermined angle of swing of the chain guide 6 corresponds to the angle allowable in the optimum distance between the guide sprocket 61 and the rear chain gear, in other words, the angle having no influence on the speed change efficiency.

The control spring 22 comprises a coiled spring which is disposed at the middle coiled portion thereof around the outside of the second spring 10 and is retained at one end to the relay member 21 and at its other end to the guide frame 63.

The control groove 23 is long corresponding to the predetermined angle of swing through which the chain guide 6 swings from the position corresponding to the smallest diameter rear chain gear to that corresponding to the predetermined larger diameter rear chain gear. Hence, when the chain guide 6 swings in excess of the predetermined angle of swing set by the control groove 23, the relay member 21 and guide frame 63 become integral with each other through the engaging member 24, and thereafter, when the chain guide 6 swings further, the control spring 22 is deflected.

Incidentally, the rear derailleur shown in FIGS. 3 and 4 has the pins 11 and 12 and those 13 and 14 slanted with respect to the plane perpendicular to the axis of the multistage rear chain gear assembly, so that, when the chain is shifted, the chain guide 6 is moved in parallel to the axis of the multistage rear chain gear assembly and also radially thereof in the plane perpendicular to the axis of the same.

Also, the linkage mechanism A is provided between the linkage member 3 or 4 and the movable member 5 or the support member 2 with a return spring (not shown) which biases the chain guide 6 axially of the multistage rear chain gear assembly, that is, toward the smaller diameter rear chain gear or the larger diameter one, normally toward the smaller diameter chain gear.

Next, explanation will be given regarding operation of the rear derailleur constructed as described above.

Referring to FIG. 5, the thick solid line indicates the state where the chain C engages with a larger diameter rear chain gear $G_5$ at the fifth speed change stage of a six-stage rear chain gear assembly including six rear chain gears $G_1$ through $G_6$, the chain guide 6 being positioned corresponding to the gear $G_5$.

Chain C, when shifted from the gear $G_5$ to the larger diameter rear chain gear $G_6$, increases in tension so that the chain guide 6 swings counterclockwise against the second spring 10 and the linkage mechanism A also swings counterclockwise against the first spring 9. At this time, if no spring force control means is provided as the conventional example, the first and second springs 9 and 10 balance with each other at the position shown by the thin dot-and-dash line in FIG. 5. However, since the spring force control means 20 is provided between the chain guide 6 and the movable member 5, when the chain guide 6 further swings in excess of the predetermined angle of swing, the second spring 10 further deflects and the control spring 22 also deflects, thereby allowing the chain guide 6 to swing against the spring forces of first spring 10 and control spring 22.

Figure 6:
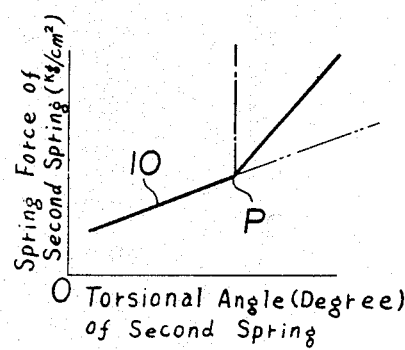
FIG. 6 is a graph explaining the relationship between a spring force and a torsional angle of a second spring.

Hence, the spring force of the second spring 10 with respect to the first spring 9, as shown by the solid line in FIG. 6, is abruptly strengthened or increased from the point P of the predetermined angle of swing of the chain guide 6, thereby restricting the counterclockwise swinging motion of the chain guide 6 with respect to the linkage mechanism A. The first spring 9 further deflects to an extent of the spring force weakened or decreased with respect to the second spring 10, so that the linkage mechanism A, as shown in the thick dot-and-dash line in FIG. 5, swings counterclockwise with respect to the base member 2, thereby correcting the guide sprocket 61 in position corresponding to the fifth stage rear chain gear $G_5$, resulting in that the guide sprocket 61 rests at the position where the same is spaced from the gear $G_5$ at the predetermined distance.

Hence, there is no risk that the distance between the guide sprocket 61 and, for example, the fifth stage rear chain gear $G_5$ will become enlarged when the chain C is shifted to the larger diameter rear chain gear. As a result, when the chain C is shifted, for example, from the gear $G_5$ to the sixth or fourth stage reaar chain gear $G_6$ or $G_4$, the speed change efficiency is improved.

Figure 7:
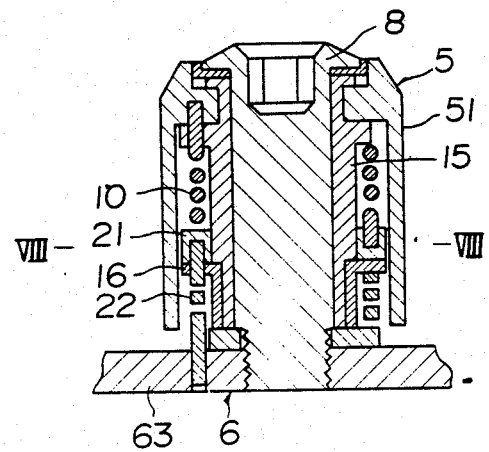
FIG. 7 is a cross-sectional view of the principal portion of a modified embodiment of the invention.
Figure 8:
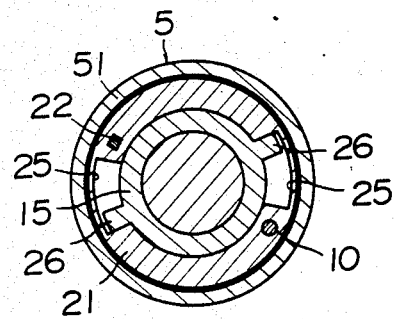
FIG. 8 is a sectional view on the line VIII—VIII in FIG. 7.

Alternatively, the control spring 22, which is separate from the second spring 10 in the above described embodiment, may be interposed between the movable member 5 and the chain guide 6 through the second spring 10 as shown in FIGS. 7 and 8.

In detail, the relay member 21 and a sleeve 16 to regulate the axially one-sided movement of the relay member 21 are rotatably supported on the outer periphery of the tubular shaft 15 fixed to the guide frame 63, and second spring 10 is interposed between the relay member 21 and the cylindrical portion 51 at the movable member 5. Control spring 22 is interposed between the relay member 21 and the guide frame 63 and has a spring force larger than that of the second spring 10. Engaging recesses 25 corresponding to the aforesaid control groove are provided at one of relay member 21 and tubular shaft 15, and engaging members 26 engageable with the recesses 25 are provided at the other. As a result, when the chain guide 6 swings in a range of the predetermined angle of swing, the control spring 22 is not deflected but the second spring 10 only is actuated by the movement of chain guide 6 through the control spring 22 and relay member 21, and when the chain guide 6 swings in excess of the predetermined angle of swing, the control spring 22 is deflected, thereby substantially strengthening the spring force of the second spring 10 with respect to the first spring 9.

Figure 9:
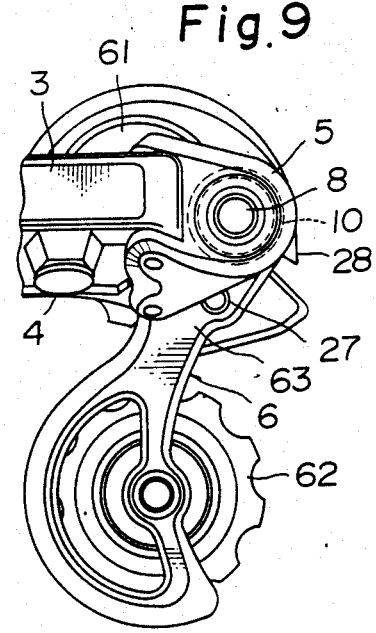
FIG. 9 is a front view of the principal portion shown in FIG. 7.

Alternatively, the control spring 22 is not used but, as shown in FIG. 9, an engaging portion 27 may be provided at one of the movable member 5 and chain guide 6, and a stopper 28 engageable with the engaging portion 27 to restrain the chain guide 6 from swinging in excess of the predetermined angle may be provided at the other, so that the stopper 28 may engage with the engaging portion 27 by the swinging motion of chain guide 16 in excess of the predetermined angle of swing, whereby the second spring 10 may have a substantially larger spring force than the first spring 9. Thus, even when the chain guide 6 swings over the predetermined angle, the second spring 10 is not further deflected and its spring force with respect to the first spring 91 will become infinitely larger from the point P as shown by the one-dot-and-dash line in FIG. 6. In addition, the engaging portion 27 may use part of the chain guide 6 or movable member 5.

The aforesaid embodiment uses a chain guide 6 of the triangular balance type, which has the same effect as the above even when using a chain guide 6 of the pendulum type.

Figure 10:
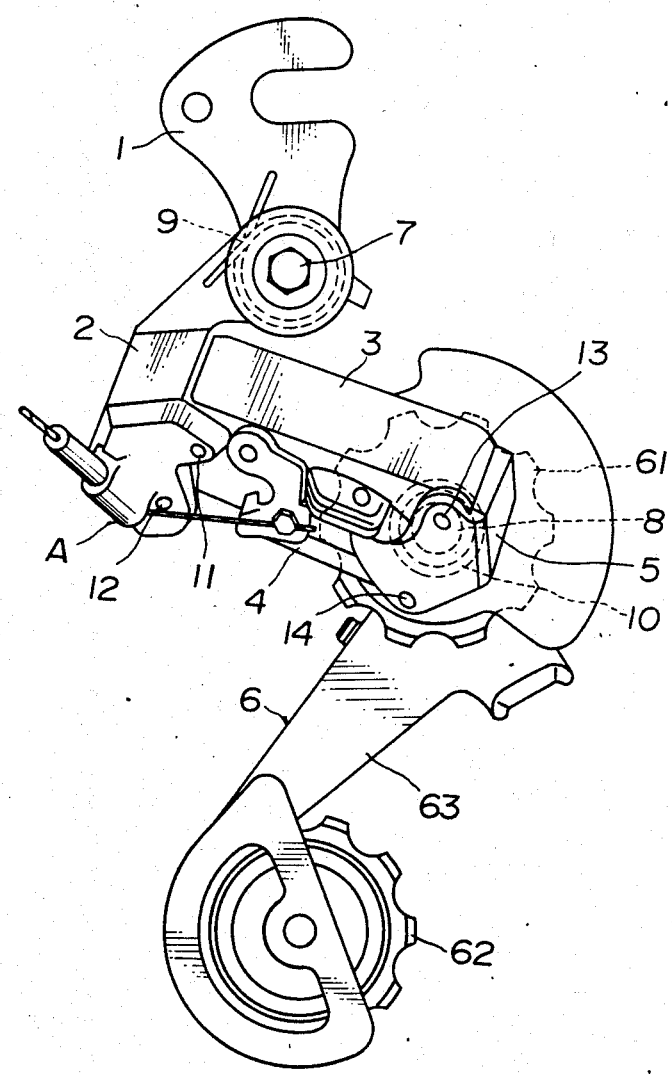
FIG. 10 is a general front view of another modified embodiment of the invention.

The rear derailleur provided with a pendulum type chain guide 6, as shown in FIG. 10, has guide sprocket 61 supported on second horizontal shaft 8 through which the guide frame 63 is supported to the movable member 5. In the aforesaid description, when the chain is to be shifted to the larger diameter sprocket, the guide sprocket moves excessively away therefrom. Alternatively, when the guide sprocket moves excessively toward the same, such rear derailleur, for example, provided with a triangular balance type chain guide 6 as shown in FIGS. 11 and 12, is provided between the linkage member 3 or 4 and the movable member 5 with the aforesaid spring force control means 20.

Figure 11:
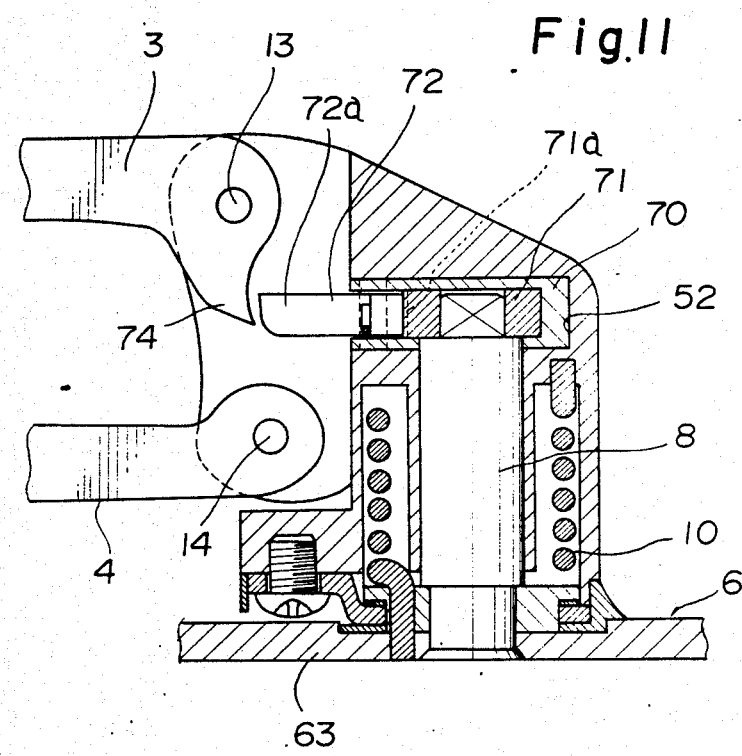
FIG. 11 is a cross-sectional view of the principal portion of the FIG. 10 embodiment.
Figure 12:
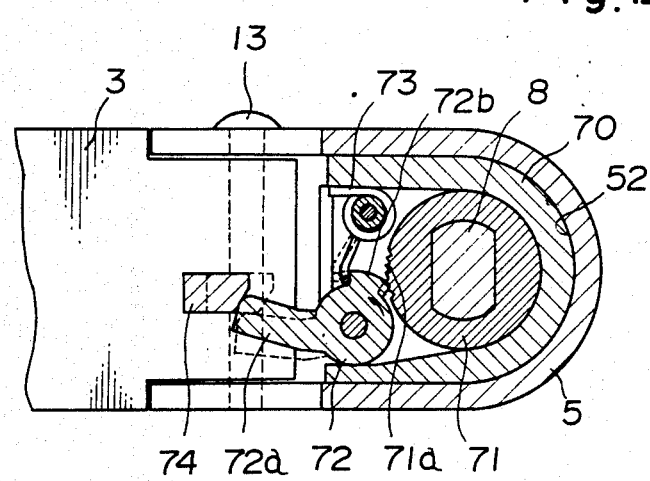
FIG. 12 is a longitudinal sectional view of the FIG. 10 embodiment.

The spring force control means 20 shown in FIGS. 11 and 12 comprises a control member 71 having teeth 71a and fitted non-rotatably onto the second horizontal shaft 8, and a control pawl member 72 which has at one end an engaging projection 72a and at the other end a pawl 72b engageable with one of the teeth 71a and is pivotably supported to the movable member 5 so that a spring 73 biases the pawl 72b to always engage with the teeth 71a. A cam 74 is provided at the linkage member 3 and engages with the projection 72a when the linkage member 3 swings thereby actuating the control pawl member 72 to disengage the pawl 72b from the tooth 71a.

In addition, in FIGS. 11 and 12, a housing 70 open at one side incorporates therein the control member 71, control pawl member 72 and spring 73 to form a control unit. Movable member 5 is provided with an insertion bore 52 into which this control unit is insertable.

Also, in FIGS. 11 and 12, the second spring 10 is interposed between the movable member 5 and the guide frame 63, and second horizontal shaft 8 is fixed to the guide frame 63. Guide frame 63 rotates together with the second horizontal shaft 8 with respect to the movable member 5, thereby swinging the chain guide 6.

In such construction, when the linkage members 3 and 4 swing with respect to the support member 2 in order to shift the chain C from the smaller diameter rear chain gear to the larger diameter rear chain gear, the pawl 72b at the control pawl member 72 disengages from the tooth 71a at the control member 71 in the range of the predetermined angle of swing, so that the second spring 10 is active. When the linkage member 3 and 4 swing with respect to the base member 2 at an angle exceeding the aforesaid range from the above condition and the chain guide 6 moves further toward the larger diameter rear chain gear, the pawl 72b at the control pawl member 72 engages with the tooth 71a at the control member 71, whereby the chain guide 6 is restricted in the clockwise swinging motion, thereby enabling the guide sprocket 61 to be prevented from moving excessively toward the larger diameter rear chain chain gear. In the above construction, the control member 71 and control pawl 72 constitute a reducing means for substantially reducing the spring force of the second spring 10.

Figure 2:
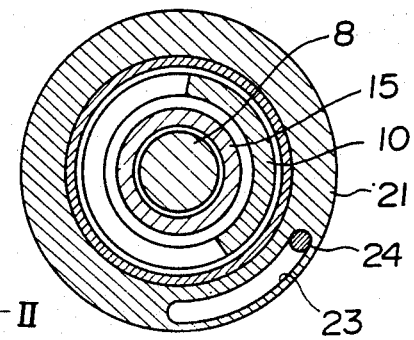
FIG. 2 is a sectional view taken on the line II—II in FIG. 1.

Alternatively, the magnifying means for magnifying the spring force of the first spring 9 may be provided between the base member 1 and the linkage mechanism A. In this case, as shown in FIGS. 1 and 2, the control spring 22 is used to constitute the magnifying means. Namely, the movable member 5 is replaced by the support member 2, the guide frame 63 by the base member 1, and the second spring 10 by the first spring 9. Hence, the control spring 22 acts on the first spring 9 to substantially magnify its spring force.

In addition, the spring force of the first spring 9 may alternatively be substantially magnified by use of the construction shown in FIGS. 7 and 8.

In this case, movable member 5 in FIGS. 7 and 8 is replaced by the support member 2, and the guide frame 63 is replaced by the base member 1. Also second spring 10 is replaced by the first spring 9, thereby substantially magnifying the spring force of the first spring 9.

In the aforesaid embodiments, the spring forces of the first and second springs 9 and 10 are set such that, when the chain C engages with the smallest diameter rear chain gear $G_1$, the distance between the guide sprocket 61 and the smallest diameter rear chain gear becomes optimum. Where the spring forces of the first and second springs 9 and 10 are set to obtain the optimum distance between the chain guide 61 and the largest diameter rear chain gear when the chain C engages therewith, the spring force control means 20 is constructed as follows.

At first, when the chain is shifted to the smaller diameter rear chain gear and the guide sprocket 61 moves excessively away therefrom, the first spring 9 acts to swing the linkage mechanism A clockwise over the predetermined angle of swing and the spring force of the second spring 10 is increased more than that of the first spring 9 so as to restrain the linkage mechanism A from clockwise swinging by the first spring 9, thereby preventing the chain guide 61 from moving radially outwardly of the smaller diameter rear chain gear and away therefrom in excess of the predetermined range.

In this embodiment, the spring force control means 20, the same as shown in, for example, FIGS. 1, 2, 7, 8 and 9, employs a magnifying means for substantially magnifying the spring force of the second spring 10.

On the contrary, when the guide sprocket 61 moves excessively toward the smallest diameter sprocket, the spring force control means 20 magnifies the spring force of the first spring 9 with respect to the second spring 10, so that the clockwise swinging motion of linkage mechanism A by the first spring 9 is larger than that of chain guide 6 by the second spring 10 when the chain C is shifted to the smaller diameter chain gear to reduce the chain tension.

In this case, the spring force control means 20, the same as, for example, the embodiment in FIGS. 11 and 12, reduces the spring force of the second spring 10 so as to make the spring force of the first spring 9 substantially larger than that of the second spring 10.

Alternatively, the spring force control means 20 may use a magnifying means provided between the base member 1 and the support member 2 at the linkage mechanism A to magnify the spring force of the first spring 9 instead of reducing the spring force of the second spring 10.

In this case, the control spring 22, as shown in FIGS. 1, 2, 7 and 8, is used and the movable member 5 in FIGS. 1, 2, 7 and 8 is replaced by the support member 2, the guide frame 63 is replaced by the base member 1, and the second spring 10 is replaced by the first spring 9.

Alternatively, the spring force control means 20 may be provided at both the base member 1 and support member 2.

As seen from the above, the derailleur of the invention is provided with the spring force control means 20 which changes the spring force of at least one of the first and second springs 9 and 10 with respect to the other by swinging motion of at least one of the linkage mechanism A and chain guide 6 in excess of the predetermined angle of swing. First and second springs 9 and 10 are provided between the base member 1 and the linkage mechanism A, and the movable member 5 thereof and the chain guide 6, so as to set the position of the guide sprocket 61 at the chain guide 6 with respect to the rear chain gear. Hence, when the chain guide 6 swings in excess of the predetermined angle of swing by increasing the tension of the chain shifted from the smaller diameter rear chain gear to the larger diameter one, the distance between the guide sprocket 61 and the larger diameter rear chain gear can be kept in the predetermined range, thereby improving the speed change efficiency. When the chain is shifted from the larger diameter rear chain gear to the smaller diameter one so as to reduce the chain tension and the linkage mechanism A swings over the predetermined angle of swing, the distance between the guide sprocket 61 and the smaller diameter rear chain gear can be kept in the predetermined range, thereby also improving the speed change efficiency.

Although several embodiments have been described, they are merely exemplary of the invention and not to be construed as limiting, the invention being defined solely by the appended claims.

What is claimed is:

1. A rear derailleur for a bicycle, for shifting a driving chain from one to another of multistage rear chain gears of the bicycle, said derailleur comprising:
   (a) a base member;
   (b) a linkage mechanism comprising a support member, a pair of linkage members and a movable member;
   (c) a first horizontal shaft supporting said linkage mechanism swingably to said base member;
   (d) a chain guide including a guide sprocket and a tension sprocket;
   (e) a second horizontal shaft supporting said chain guide swingably to said movable member of said linkage mechanism;
   (f) a first spring interposed between said base member and said linkage mechanism and biasing said linkage mechanism in a direction of moving said guide sprocket away from said rear chain gears;
   (g) a second spring interposed between said movable member and said chain guide and biasing said chain guide in a direction of applying tension to said chain, said first and second springs each having a spring force by which a distance between said guide sprocket and said rear chain gear is optimum when said chain engages with one of a smallest diameter rear chain gear and a largest diameter rear chain gear of said multistage rear chain gear; and
   (h) a spring force control means for changing the spring force of one of said first and second springs with respect to the other by swinging motion of at least one of said linkage mechanism and said chain guide in excess of a predetermined angle of swing.

2. A rear derailleur for a bicycle according to claim 1, wherein said first and second springs each have a spring force by which a distance between said guide sprocket and said smallest diameter rear chain gear becomes optimum when said chain engages with said smallest diameter rear chain gear, and said spring force control means changes the spring force of said second spring with respect to said first spring when said chain is shifted to a larger diameter rear chain gear and at least one of said linkage mechanism and chain guide swings in excess of predetermined angle of swing.

3. A rear derailleur for a bicycle according to claim 2, wherein said spring force control means comprises a spring force magnifying means which includes a control spring actuated by swinging motion of said chain guide in excess of a predetermined angle of swing with respect to said movable member, and said control spring operates to change the spring force of said spring to be substantially larger than the spring force of said first spring.

4. A rear derailleur for a bicycle according to claim 2, wherein said spring force control means includes a spring force magnifying means which includes an engaging portion and a stopper engageable therewith by swinging motion of said chain guide in excess of the predetermined angle of swing, and said engaging portion engages with said stopper to change the spring force of said spring to be substantially larger than the spring force of said first spring.

5. A rear derailleur for a bicycle according to claim 1, wherein said first and second springs each have a spring force to provide an optimum distance between said guide sprocket and said smallest diameter rear chain gear when said chain engages with said smallest diameter rear chain gear, and said spring force control means causes the spring force of said first spring to become larger than the spring force of said second spring when said chain is shifted to a larger diameter rear chain gear and one of said linkage mechanism and chain guide swings in excess of a predetermined angle of swing.

6. A rear derailleur for a bicycle according to claim 5, wherein said spring force control means includes a spring force magnifying means which includes a control spring actuated by swinging motion of said linkage mechanism in excess of a predetermined angle of swing with respect to said base member, and said control spring operates to change the spring force of said first spring to be substantially larger than the spring force of said second spring.

7. A rear derailleur for a bicycle according to claim 5, wherein said spring force control means includes a spring force reducing means for said second spring, said spring force reducing means operating to not apply resistance to swinging motion of said chain guide with respect to said movable member when an angle of swing of said chain guide is in a predetermined range with respect to said movable member and to apply resistance to the swinging motion of said chain guide to substantially reduce the spring force of said second spring when said angle of swing exceeds the predetermined range, thereby causing the spring force of said first spring to be larger than spring force of said second spring.

8. A rear derailleur for a bicycle according to claim 7, wherein said spring force reducing means includes a control member having outer peripheral teeth and coupled non-rotatably relative to said second horizontal shaft fixed to said chain guide, a control pawl member supported to said movable member and having a pawl engageable with one of said teeth and an engaging projection, a bias means which biases said pawl at said control pawl member in a direction of engaging with said teeth, and a cam disposed on said linkage member of said linkage mechanism, said cam operating to disengage from said engaging projection by the swinging motion of said linkage member over the predetermined range to cause said pawl to engage with said tooth and to substantially reduce the spring force of said second spring.

9. A rear derailleur for a bicycle according to claim 1, wherein said first and second springs each have a spring force by which a distance between said guide sprocket and said largest diameter rear chain gear becomes optimum when said chain engages with said largest diameter rear chain gear, and said spring force control means causes the spring force of said first spring to become larger than the spring force of said second spring when said chain is shifted to a smaller diameter rear chain gear and at least one of said linkage mechanism and chain guide swings in excess of a predetermined angle of swing.

10. A rear derailleur for a bicycle according to claim 9, wherein said spring force control means includes a spring force magnifying means which includes a control spring actuated by swinging motion of said linkage mechanism in excess of a predetermined angle of swing with respect to said base member, and said control spring operates to change the spring force of said first spring to be substantially larger than the spring force of said second spring.

11. A rear derailleur for a bicycle according to claim 9, wherein said spring force control means includes a spring force reducing means for said second spring, said spring force reducing means operating to not apply resistance to the swinging motion of said chain guide with respect to said movable member when an angle of swing of said chain guide with respect to said movable member is within a predetermined range and to apply resistance to the swinging motion of said chain guide to substantially reduce the spring force of said second spring when said angle of swing exceeds the predetermined angle, thereby causing the spring force of said first spring to be larger than the spring force of said second spring.

12. A rear derailleur for a bicycle according to claim 9, wherein said spring force reducing means includes a control member having outer peripheral teeth, said control member being coupled non-rotatably relative to said second horizontal shaft fixed to said chain guide, a control pawl member supported to said movable member and having a pawl engageable with said teeth and an engaging projection, a bias means for biasing said pawl of said control pawl member in a direction of engaging with said teeth, and a cam disposed on said linkage member of said linkage mechanism, said cam operating to disengage from said engaging projection by swinging motion of said linkage member over the predetermined range to cause said pawl to engage with said teeth to substantially reduce the spring force of said second spring.

13. A rear derailleur for a bicycle according to claim 1, wherein said first and second springs each have a spring force by which a distance between said guide sprocket and said largest diameter rear chain gear becomes optimum when said chain engages therewith, and said spring force control means causes the spring force of said second spring to become larger than the spring force of said first spring when said chain is shifted to a smaller diameter rear chain gear and at least one of said linkage mechanism and chain guide swings in excess of the predetermined angle of swing.

14. A rear derailleur for a bicycle according to claim 13, wherein said spring force control means includes a spring force magnifying means which includes a control spring actuated by swinging motion of said chain guide in excess of a predetermined angle of swing with respect to said movable member, and said control spring operates to change the spring force of said second spring to be substantially larger than the spring force of said first spring.

15. A rear derailleur for a bicycle according to claim 13, wherein said spring force control means includes a spring force magnifying means which includes an engaging portion and a stopper engagable therewith by the swinging motion of said chain guide in excess of said predetermined angle of swing, and said engaging portion engages with said stopper to change the spring force of said second spring to be substantially larger than the spring force of said first spring.

* * * * *